US007281203B2

(12) United States Patent
Gessner

(10) Patent No.: US 7,281,203 B2
(45) Date of Patent: Oct. 9, 2007

(54) SELECTING A DTD FOR TRANSFORMING MALFORMED LAYOUT EXPRESSIONS INTO WELLFORMED ONES

(75) Inventor: Rick Gessner, San Diego, CA (US)

(73) Assignee: Netscape Communications Corporation, Mountain View, CA (US)

( * ) Notice: Subject to any disclaimer, the term of this patent is extended or adjusted under 35 U.S.C. 154(b) by 0 days.

(21) Appl. No.: 09/162,735

(22) Filed: Sep. 29, 1998

(65) Prior Publication Data
US 2002/0032709 A1 Mar. 14, 2002

(51) Int. Cl.
*G06F 15/00* (2006.01)
(52) U.S. Cl. ...................................................... 715/513
(58) Field of Classification Search ............. 715/501.1, 715/513, 760
See application file for complete search history.

(56) References Cited

U.S. PATENT DOCUMENTS

| | | | | |
|---|---|---|---|---|
| 4,969,093 | A * | 11/1990 | Barker et al. | 709/102 |
| 5,438,512 | A * | 8/1995 | Mantha et al. | 707/517 |
| 5,583,762 | A * | 12/1996 | Shafer | 707/532 |
| 5,787,449 | A * | 7/1998 | Vulpe et al. | 707/513 |
| 5,848,386 | A * | 12/1998 | Motoyama | 704/5 |
| 5,875,441 | A * | 2/1999 | Nakatsuyama | 707/1 |
| 5,933,841 | A * | 8/1999 | Schumacher et al. | 707/501 |
| 5,953,732 | A * | 9/1999 | Meske, Jr. et al. | 707/513 |
| 6,014,680 | A * | 1/2000 | Sato et al. | 707/513 |
| 6,061,697 | A * | 5/2000 | Nakao | 707/513 |
| 6,351,766 | B1 * | 2/2002 | Vidovic | 707/10 |
| 2002/0002566 | A1 * | 1/2002 | Gajraj | 707/513 |

OTHER PUBLICATIONS

Altschuler, Liora; Alexander, George. Coming of Age in Cyberspace: Births, Deaths, and Milestones at SGML/XML '97 (conference held week of Dec. 8, 1997). Seybold Report on Internet Publishing, Jan. 1998, vol. 2 No. 5, p. 21.*
Raggett, Dave; LeHors, Arnaud; Jacobs, Ian. "HTML 4.0 Specification" W3C Recommendation dated Dec. 13, 1997.*
Powell, Thomas A. Extend the Web: An XML Primer. Internetweek, Nov. 24, 1997, Issue 691, p. 47.*
Cottrell, Donald R. "Electronic Component Information Exchange." Proceedings of the 34th Annual Conference on Design Automation Conference (held Jun. 9-13, 1997). Pages 559-563.*

(Continued)

*Primary Examiner*—Cesar B Paula
(74) *Attorney, Agent, or Firm*—Fish & Richardson P.C.

(57) ABSTRACT

A network client such as a world wide web browser and corresponding method that includes and involves a scanner component that accesses an input content stream via a network connection (e.g., file, document or other content/data source located at a URL via the Internet and www., etc.) to extract renderable content therefrom, a parsing component coupled to the scanner component for parsing the renderable content, and a replaceable document type definition component configured to control the parsing component based on a particular document type definition corresponding to a particular grammar. The replaceable document type definition component being replaceable during execution of the network client. The network client and its corresponding method may be used within a data processing system to receive and manifest content based on a document type definition that is not otherwise known prior to execution and run time of the network client.

19 Claims, 5 Drawing Sheets

OTHER PUBLICATIONS

Prescod, Paul. "Multiple Media Publishing in SGML." Proceedings of the 14th Annual International Conference on Marshaling New Technological Forces: Building a Corporate, Academic, and User-Oriented Triangle (held Oct. 19-22, 1996). Pages 3-9.*

Alexander, George; Altschuler, Liora. "SGML Europe '96: What's the Next Step for SGML?" Seybold Report on Publishing Systems, Jun. 30, 1996, vol. 25, No. 19, p. 12.*

Colby, Martin. Special Edition Using SGML. Que, Macmillan Computer Publishing. © 1996. Chapter 17.*

"Extensible Markup Language (XML) 1.0", W3C Recommendation, Feb. 10, 1998.*

Connolly et al, "The Evolution of Web Documents: The Ascent of XML", Sep. 21, 1997.*

* cited by examiner

SELECTING A DTD FOR TRANSFORMING MALFORMED LAYOUT EXPRESSIONS INTO WELLFORMED ONES

BACKGROUND OF THE INVENTION

1. Field of the Invention

The present invention relates to software systems (e.g., world wide web browsers) and processes used to render and otherwise manifest content (e.g., HTML content, etc.) received via a network.

2. Description of the Related Art

Software packages used to receive content from server systems located on a network of computer systems such as the Internet are well known. One such class of software packages known as world wide web browsers or web "clients" and "browsers" are used by millions of computer users everyday to access Internet sites, receive dynamic content therefrom, and manifest the same on video monitors, through audio subsystems, on printers, etc. In fact, the increased popularity of the Internet has made the web browser a staple computing tool much like word processors and electronic spreadsheets.

Typically, web browsers are designed and implemented to receive and manifest hyper-text data or content (files) formatted in accordance with a standard content rendering scheme such as one known as the hyper-text markup language (HTML). HTML is a content rendering definition that allows text, graphics, and other data objects to be included within a data file (a source file) along with layout instructions or tags (tag pairs) that guide and instruct a web browser layout engine in the layout and rendition of the HTML data included within the data file. Well formed HTML "documents" are well known by those skilled in the art.

Despite their ability to render content formatted in accordance with HTML standards, currently available web browsers are "hard-coded" in terms of their ability to receive, interpret, and render content within a client computing environment. That is, current web browsers operate on an assumption that they will receive well formed content HTML according to a particular type definition that is known by such web browsers a priori. Although robust content rendering models have been developed and deployed, current-day web browsers remain static in terms of their ability to receive and render content that must fit particular well known rendering schemes (e.g., such as those defined by many versions of HTML, etc.).

To address the limitations of web browsers to receive rich content and data of variant data types and definitions, web browser developers have defined and implemented elaborate schemes by which their web browsers may be enhanced. For example, many web browsers allow "plug-in" or "helper" applications to be loaded (during browser runtime) to facilitate the receipt and manifestation of content received from a remote server system. For example, many web browsers allow sound-manifestation modules (plug-ins) to be loaded to allow a web browser to manifest sound and music data through an audio subsystem coupled to a user's personal computer.

Unfortunately, the ability to load plug-in and helper applications to handle and manage particular types of data that may be received via a network connection has led to larger browser programs, the inability to immediately manifest content, and frustration on the part of users who are constantly faced with having to locate, download, and wait for a particular, up-to-date plug-in or helper application.

In addition to plug-ins and helper applications, the advent and inclusion of JAVA™ and related systems has eased the problems associated with dynamic alteration of web browser environments to facilitate dynamic manifestation of content and data within a web browser environment. Unfortunately, like plug-ins and helper applications, JAVA and derivatives thereof require certain infrastructures that must be known to a web browser environment a priori. For example, in the case of interpreted JAVA, a language interpreter must be loaded during browser runtime and take control of the browser environment to process and, possibly, render content received via a network connection. There is no way for the browser or any of its control facilities to affect the processes within the JAVA environment, which, in effect, runs independently of the rendering systems and models that are already included within the browser environment.

Accordingly, currently there is no way for web browser programs to dynamically change themselves to recognize content which may be formatted according to a document data type definition that is new or otherwise not currently known to such programs at runtime. In other words, currently there is no way for a web browser program to receive, interpret, and manifest content that is formatted according to a document type definition that is not known a priori. As such, web browser programs continue to remain as relatively static environments that can process only a limited amount of data and content based on only a limited set of document and data type definitions.

Thus, there exists a need for a new and improved web browser or network client that can be dynamically altered (during runtime) to facilitate the receipt, interpretation, processing, and manifestation of content and data formatted according to a document type definition that is otherwise not known a priori. To be viable, such a new and improved network client must be able to efficiently process document type definitions that are received contemporaneously with correspondingly formatted documents from network services, etc..

SUMMARY OF THE INVENTION

The present invention solves the aforementioned problems and, in so doing, provides certain benefits not heretofore realized with other network clients and world wide web browsers. For example, a web browser designed and implemented in accordance with the present invention can now receive, process, and manifest content from a network connection that is formatted in accordance with a particular grammar contained within a corresponding document data type definition file or object. In other words, a document (say an HTML) document can be processed within a browser environment based on a parsing grammar that is dynamically received and inserted into a parsing engine. In turn, the present invention softens the hard-wired nature of document processing within a browser environment and allows dynamic replacement of parsing grammars which rendition systems can utilize to render and layout and otherwise manifest network content. The present invention achieves such a dynamic content parsing capability by combining computer language parsing and processing techniques with browser and network client technologies to deliver a new and improved network client that is extensible, robust, and capable of processing documents formatted based on grammars that are otherwise not known a priori to runtime.

The present invention solves the aforementioned problems and delivers the above-stated benefits by providing a network client such as a world wide web browser and corresponding method that includes and involves a scanner component that accesses an input content stream via a network connection (e.g., file, document or other content/data source located at a URL via the internet and www., etc.) to extract renderable content therefrom, a parsing component coupled to the scanner component for parsing the renderable content, and a replaceable document type definition component configured to control the parsing component based on a particular document type definition corresponding to a particular parsing grammar. The replaceable document type definition component is replaceable during execution (runtime) of the network client.

According to another aspect of the present invention, provided is a method of using a personal computing system that is equipped with a network client. The method includes the steps of executing a network client to access a network server system to receive data therefrom. The network client includes a scanner component for accessing the network server to receive an input content stream and to extract renderable content therefrom, a parsing component coupled to the scanner component for parsing the renderable content, and a replaceable document type definition component configured to control the parsing component based on a particular document type definition corresponding to a particular grammar. The replaceable document type definition component is replaceable during execution of the network client. The method also includes the steps of causing the scanner component to access the input content stream via a network connection to extract the renderable content therefrom, receiving the replaceable document type definition related to the renderable content via the network connection, causing the parsing component to parse the renderable content based on the replaceable type definition to generate a content model, and manifesting the content model within the personal data processing system.

BRIEF DESCRIPTION OF THE DRAWINGS

The present invention is discussed in detail below with regard to the drawing figures attached hereto, of which.

DETAILED DESCRIPTION OF THE PREFERRED EMBODIMENTS

Figure 1:
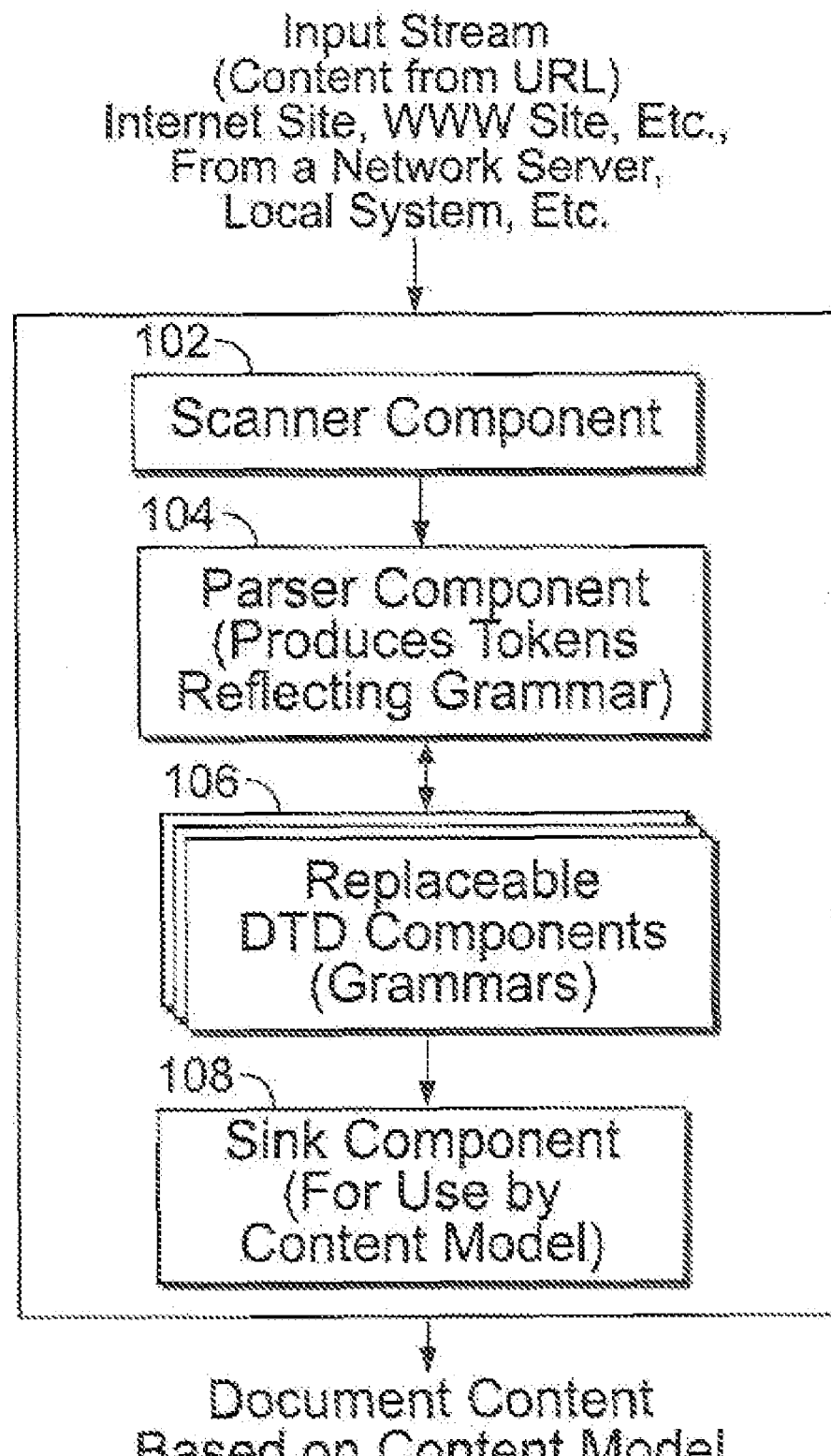
FIG. 1 is a block diagram of a network client (e.g., a web browser) parsing engine configured to receive replaceable document type definition components corresponding to documents which may be retrieved via a network connection and which are formatted in accordance with a grammar not otherwise known a priori.

The present invention is now discussed in detail with regard to the drawing figures that were briefly described above. Unless otherwise indicated, like parts and processes are referred to with like reference numerals.

Referring now to FIG. 1, depicted therein is a block diagram of a network client (e.g., a web browser) having a parsing engine 100 that includes multiple components to facilitate a parsing system. Parsing engine 100 includes a scanner component 102, a parser component 104, replaceable DTD components 106, and a sink component 108. Such components are further described below. As with any parsing system, a input stream (content) may be input to parsing engine 100 to produce a corresponding document content output as illustrated in FIG.1.

A parsing engine such as parsing engine 100 represents a first stage in a sequence of system operations that interact in order for a network client or web browser to display and manifest HTML and other types of documents. In order for a layout engine to successfully process content received via a network connection, for example, parsing engine must be fast, extensible, and above all, it must offer robust error handling. The parsing engine in the context of the particular invention, and, in particular, parsing engine 1000 has a modular design that actually permits a system to parse almost any kind of data. However, like any web browser, the present invention's parsing engine 100, in particular, is optimized for HTML and other such markup languages. Conceptually, a parsing engine like parsing engine 100 is used to transform a source document from one form to another. In the case of HTML, for example, parsing engine 100 transforms the hierarchy of HTML tags (the source form) into another form that an underlying layout and display engine requires for appropriate rendition (the target form) based on a particular designed content model.

As noted above, parsing engine 100 includes a set of components which operate during the transformation process as a document moves from source form to target form. Such elemental objects or components of parsing system 100 as mentioned above, are so called as they are combined dynamically at run time to achieve a layout transformation. By substituting or replacing a different set of components in accordance with the present invention, it is possible to perform alternative transformations. In other words, the present invention allows transformation to occur (rendition of content through a network client such as a web browser) without knowing a particular content parsing grammar a priori.

Now with specific attention to the components within parsing engine 100, the scanner component 102 is the first major component. Scanner component 102 provides an incremental "push-based" API (application program interface) that provides methods for accessing characters in an input stream (usually a file, document or other content/data source located at a URL, a uniform resource locator), finding particular sequences, collating input data, and skipping over unwanted data. A fairly simple scanner can be implemented and used effectively to parse everything from HTML and XML to C++. Such a scanner and the implementation thereof will be readily understood by those skilled in the art.

The second major component in parsing engine 100 is parser component 104. Parser component 104 controls and coordinates the activities of the other components in parsing engine 100. This approach lies upon the fact that regardless of the form of the source document, the transformation process remains the same. While other components of parsing engine 100 are meant to be dynamically substituted or replaced according to the source document type, it is rarely necessary to alter parser component 104.

Parser component 104 also drives tokenization. Tokenization refers to the process of collating atomic units (e.g., characters) in the input stream into higher level structures called tokens. For example, an HTML tokenizer converts a raw input stream of characters into HTML tags. For maximum flexibility, the tokenizer makes no assumptions about the underlying grammar about which documents are to be scanned. Instead, the details of the actual grammar being parsed is up to a DTD (document type definition) object that understands the constructs that comprise the grammar. The importance of such a design is that it allows parsing engine 100 to dynamically vary the language it is tokenizing without changing the tokenizer itself. The DTD object that is defined is so defined by replaceable DTD components 106 as discussed below.

In parsing engine 100, one or more replaceable DTD components 106 may be utilized. Such DTD components 106 describe the rules for well-formed and/or valid documents in a target grammar and, more particularly, for well-formed expressions and objects within a particular grammar. For example, in HTML, the DTD declares and defines the tag sets, the associated set of attributes, and the hierarchical (nesting) rules of HTML tags. That is, a DTD component according to the present invention will declare, in the case of HTML for example, a tag set expression for paragraph text (e.g., "<p>. . . text stream . . . <p>"). Other expressions will be defined by such a grammar construct as provided by DTD components. Such definitions will be immediately understood by those skilled in the art. Once again, by separating the DTD components 106 from other components in the parser engine, it becomes possible to use the same system to parse a much wider range of document types and those containing expressions corresponding to different and varying rules of grammar. Simply put, this means that the same parser can provide an input to the browser biased (via the DTD components 106) to behave like any other HTML browser. The same can be said for XML, etc.

The present invention may be configured to allow for malformed documents and expressions to be constructed based on corresponding grammars contained within DTD components. That is, the present invention allows dynamic configuration of parsing systems through use of replaceable DTD components 106, and the transformation of otherwise malformed documents and expressions into well-formed expressions that a content model, for example, can later understand and process. Such transformation processes may be borrowed from artificial intelligence processing schemes and may involve rules of propagation, etc. For example suppose a parsing engine 100 were to realize a token for the start of paragraph text outside of an HTML file starting tag. Such a construct would otherwise be inappropriate and, in some cases by some browsers, unrenderable and therefore discarded. In contrast, the present invention now allows such tokens and constructs to be "fixed" or corrected (i.e., transformed into well-formed expressions) based on document context as defined by replaceable DTD components provided by the present invention, etc. That is, by recognizing the context of the tokens realized by a parsing engine provided by the present invention, etc., the present invention can transform otherwise malformed expressions and documents into well-formed objects which can be processed by an appropriate content model.

Also included within parsing engine 100 is sink component 108. Once the tokenization process is complete, parsing engine 100 needs to emit it contents (tokens). Since the parser doesn't know any thing about the document or content layout model, the containing application, (e.g., a network client like or similar to a web browser) must provide a "content-sink". The content sink is a simple API that accepts a container, leaf and text nodes, and constructs the underlying document/content model accordingly. DTD components 106 interact with sink component 108 to cause the proper content model to be constructed based on the input set of tokens.

The components shown in FIG. 1 as part of parsing engine 100 may be implemented as language parsing and translation routines within a object oriented programming environment such as within C++, etc. It is important to note, that replaceable DTD components 106 are, in fact, replaceable at run time. That is, because replaceable DTD components 106 may be replaced with other DTD components corresponding to other document type and parsing grammars, a network client such as a web browser including the same may operate upon content received via a network connection that is formatted (well formed, preferably) and manifested within a web browser environment based upon a particular set of grammars and rules.

The encapsulation of grammars within a particular file structure and/or data structure like or similar to replaceable DTD components 106, etc, will be readily understood by those skilled in the art of computer language design and construction. It is the present invention's incorporation of such technology into a network clients software package such as a browser environment to dynamically change the same to facilitate the display of content based upon a particular grammar during run time that enables a new and improved network client and, in particular, browser software package.

Figure 2:
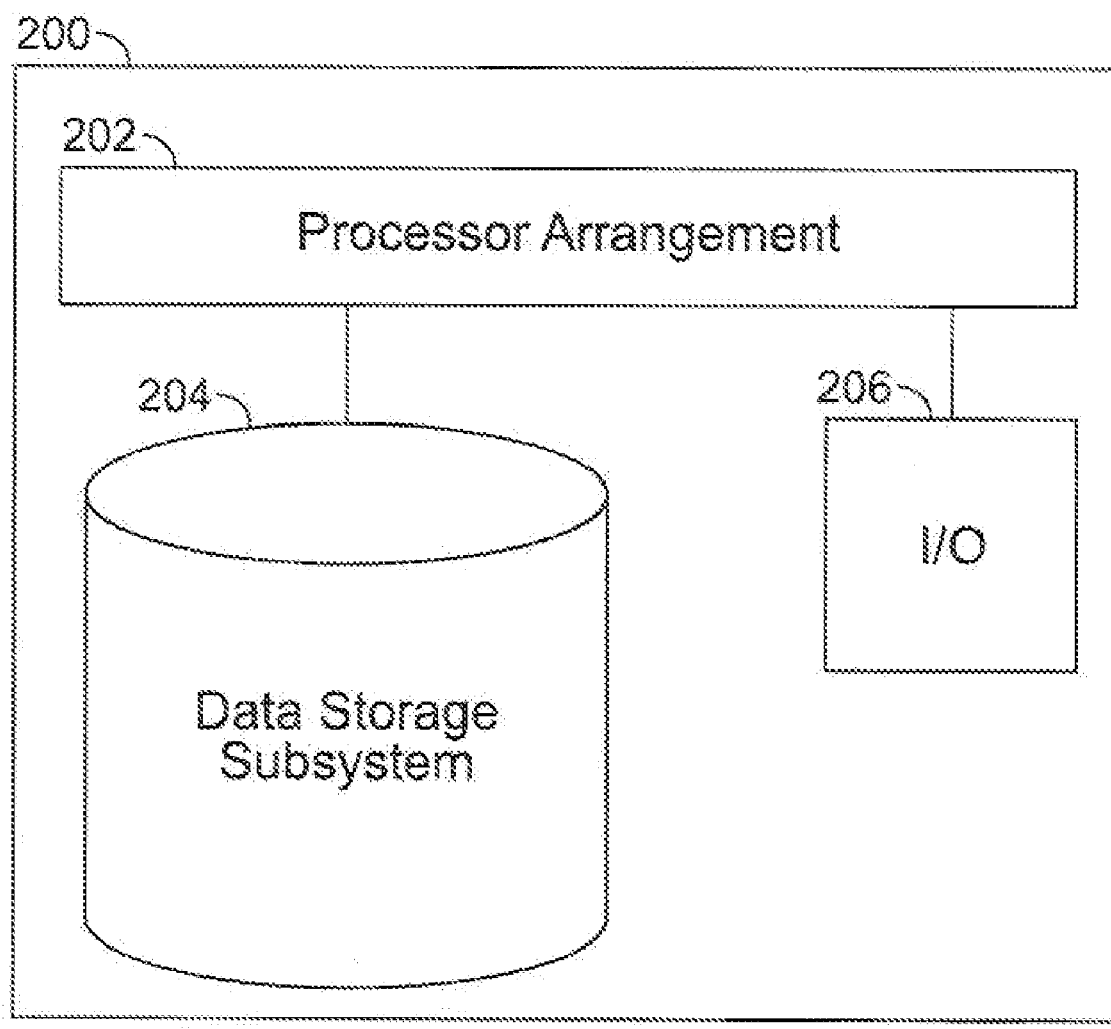
FIG. 2 is a block diagram of an automatic data processing system that may be outfitted with a network client that incorporates a parsing engine like or similar to one shown in FIG. 1.

Referring now to FIG. 2, depicted therein is a system diagram of an automatic data processing system 200 that includes a processor arrangement 202 including one or more processing elements such as CPU's (Central Processing units), a data storage subsystem 204 such as one including multiple disk-based data storage facilities, and an I/O subsystem 206 to facilitate network communications, etc. A network client, such as one including parsing engine 100, may be expected to facilitate the receipt and manifestation of content in accordance with particular grammars contained within particular replaceable DTD components 106. Automatic data processing system 200 facilitates the loading and execution of a browser environment, for example, that may manifest and display HTML, etc. content in accordance with particular grammars contained within DTD components 106.

Accordingly, automatic data processing system 200 may be implemented utilizing a personal computing system such as a personal computer like or similar to a personal computer manufactured and marketed by IBM CORPORATION. Such a system may be equipped and outfitted to operate in accordance with the MICROSOFT WINDOWS™ 95™, 98™, NT™ operating systems which are manufactured and marketed by MICROSOFT CORPORATION. MICROSOFT WINDOWS 95, 98 and NT are trademarks of MICROSOFT CORPORATION.

In implementing and operating parsing engines such as parsing engine 100, several phases of operation occur. In particular, in a first phase, object construction occurs during the parsing of a document. The containing application (e.g., a network client), initiates the parse by creating a URL tokenizer object, and an HTML parse object. The parser is assigned a sink such as sink component 108, and a DTD component such as one from replaceable DTD components 106. The DTD component selected understands the grammar of the document being parsed, while the sink component interfaces to allow the DTD component to properly build a content model for later or subsequent rendering, layout, or manifestation via appropriate and well known document rendition modules, objects, processes.

The second phrase of operation is involved with the opening of an input stream. The parsing process begins when an URL or other network address is accessed, a file or content/data source is opened and content is provided in the form of an input stream. The stream is given to scanner component 102 which controls all such access operations. The parser engine then instructs the tokenizer to initiate a tokenization phase. The tokenizer is part of the parser component 104. Tokenization is an incremental process, and can interrupt when the scanner component 102 is blocked awaiting network data, etc.

A third phase of operation involves tokenization. The tokenizer aspect of parser component 104 controls and coordinates the tokenization of the input stream into a collection of tokens. Different grammars will have their own subclasses of tokens as well as their own corresponding DTD components. As the tokenizer runs, it repeatedly calls methods to get additional tokens for processing. Such tokenization iteration continues until an end-of-file occurs on an input stream, an unrecoverable error occurs such as network traffic stoppages or delays, etc.

A second phase of operation involves token iteration and document construction. After the tokenization phase completes, parsing enters the token iteration phase which validates the document and causes a content model to be constructed. Token iteration proceeds until an unrecoverable error occurs, or the parser has visited or processed each token stored within sink component 108. The tokens are collected into related groups of information according to the rules provided by the DTD component class (provided by a corresponding DTD component). The DTD controls the order in which the tokens can appear in relation to each other. At well defined times during the process (e.g., periodically based upon the number of tokens, etc.) the parser notifies sink component 108 about the parse context, instructing the sink component 108 to construct the document according to the state of the parser.

Figure 3A:
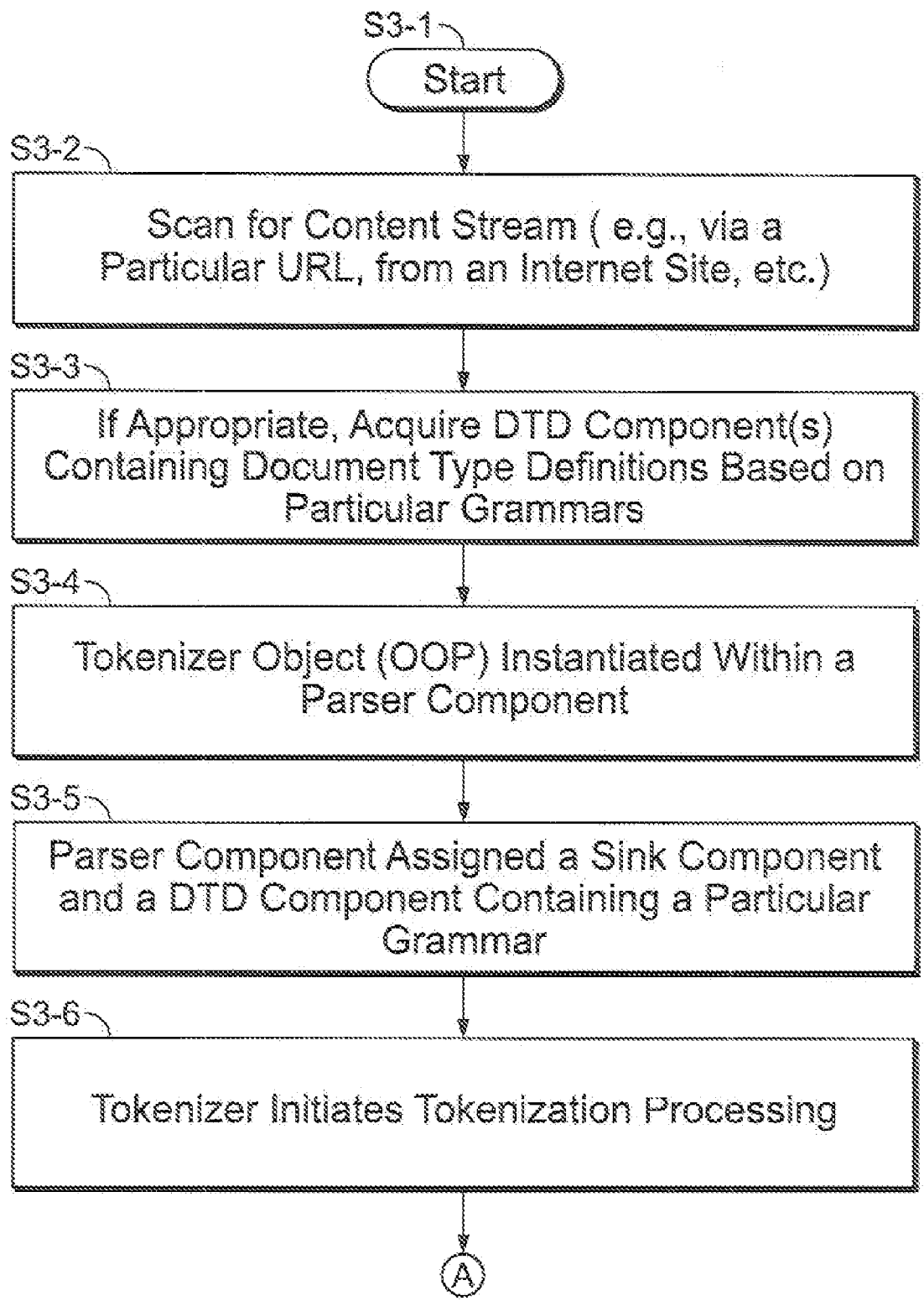
FIG. 3A is a flowchart that illustrates the processes that are performed to parse a document in the context of a network client and connection based on a grammar included within a replaceable document type definition component that is otherwise not known a priori to runtime of the network client.
Figure 3B:
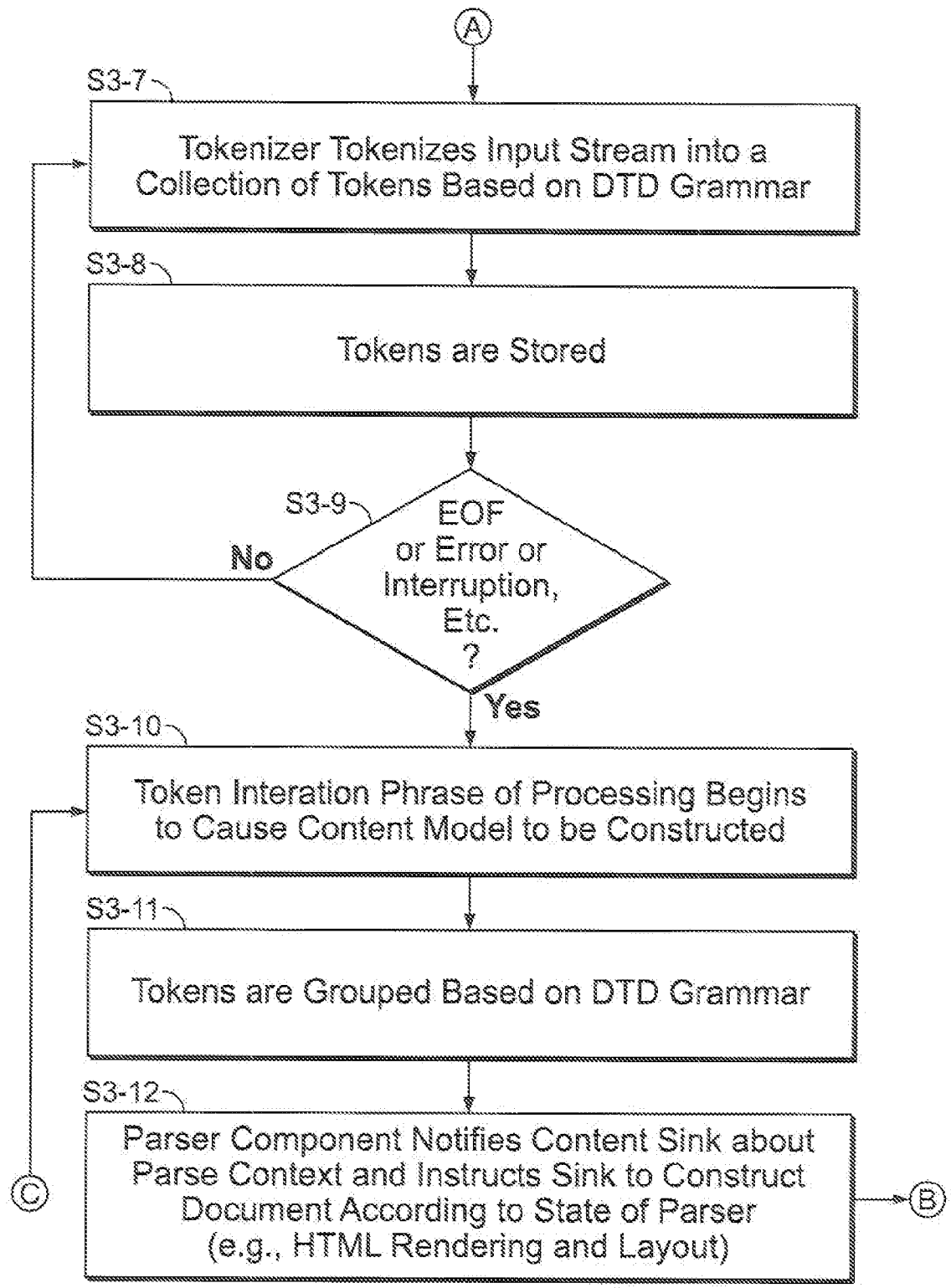
FIG. 3B is a continuation flowchart of the flowchart started in FIG. 3A.
Figure 3C:
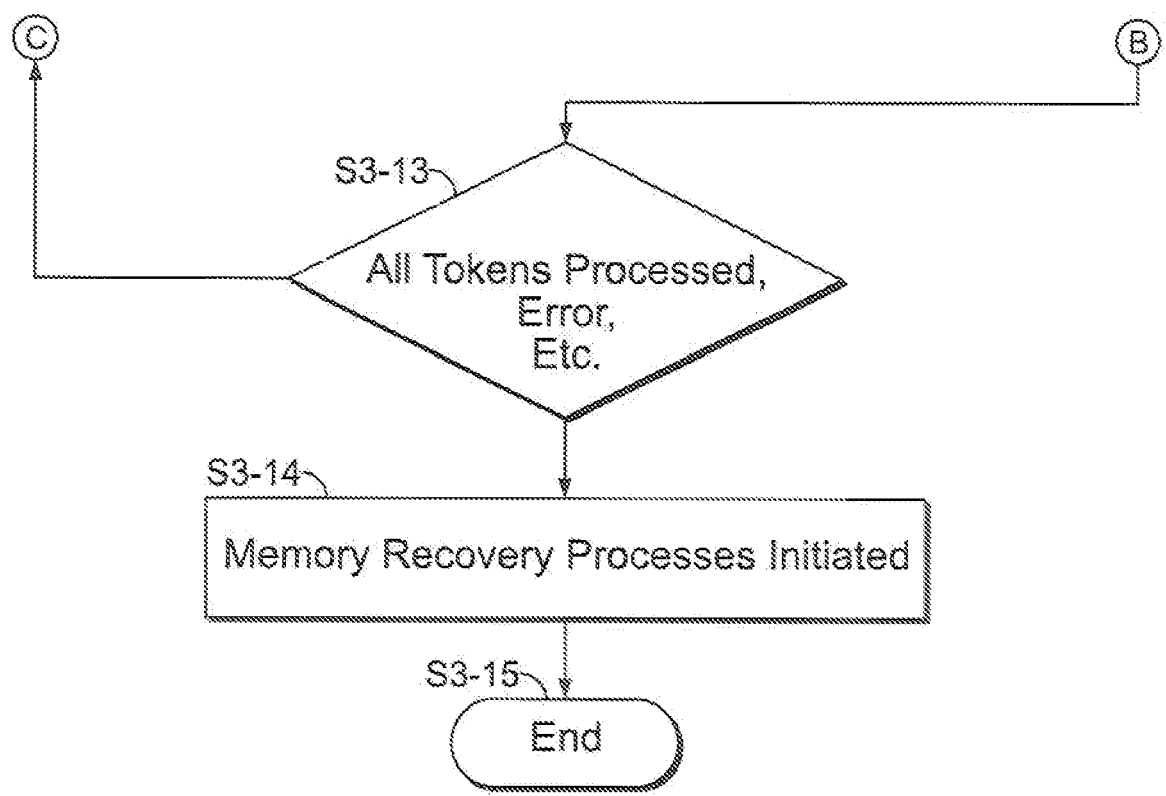
FIG. 3C is the conclusion flowchart of the flowchart illustrated in FIGS. 3A and 3B.

Finally, a fifth phase of operation, object destruction, is initiated once tokenization and iteration have concluded. The objects of the parse system are destroyed to conserve memory and resources. The above described phases of operation of parsing engine 100 in the context of the present invention are further described below with reference to FIGS. 3A, 3B and 3C. In particular, FIGS. 3A, 3B, and 3C illustrate a flowchart that particularly identifies the process steps that are carried out and performed within parsing engine 100 to facilitate the retrieval, processing and, rendering (manifesting) of content received via a network connection in accordance with replaceable DTD components or those components that define well formed documents according to particular and replaceable grammars within a network client or browser environment.

Processing starts at step S3-1 and immediately proceeds to step S3-2. At step S3-2, content is scanned for from a content stream (e.g., file, document or other content/data source located at a URL via the Internet and www.).

Next, at step S3-3, one or more DTD components containing particular grammars relative to data streams to be rendered with in a network client environment, are acquired via a network connection. Of course such DTD components may be locally stored, but the present invention does contemplate the notion that such DTD components along with corresponding documents formatted according to corresponding grammars may be stored remotely on server systems and delivered at and during run time of a browser, etc. to facilitate dynamic replacement of particular grammars and to further facilitate the rendering of content based thereon.

Next, at step S3-4, a tokenizer object within a parser component of a parsing engine 100 will be instantiated within that parser component.

Next, at step S3-5, parser component 104 is assigned a sink component 108 and one or more DTD components 106 containing particular grammars as discussed above.

Next, at step S3-6, the tokenizer within parser component 104 initiates a tokenization process.

Processing proceeds at the top of FIG. 3B.

At step S3-7, the tokenizer within parser component 104 tokenizes the input stream into a collection of tokens based upon a DTD grammar maintained or corresponding to a particular DTD component 106.

Next, tokens are stored within sink component 108 at step S3-8.

At step S3-9, a determination will be made as to weather the end-of-file or some other end of data stream indicator is found or whether an error in the input stream exists. If not, processing proceeds back to step S3-7 as described above. When an end-of-file or other terminator or error occurs, processing proceeds to step S3-10.

At step S3-10, a token iteration phase begins to cause a content model to be constructed. Next, at step S3-1 1 tokens are grouped based on the DTD grammar as discussed above.

Next, at step S3-12, parser component 104 notifies the contents sink or sink component 108 about the parser context and instructs the sink component 108 to construct a document model according to the state of the parser (e.g., HTML rendering and layout).

Processing then proceeds to the top of FIG. 3C.

In FIG. 3C and, in particular, at step S3-13, a determination will be made as to whether all tokens have been processed or an error condition has occurred. An error will occur if machine failure occurs, etc. If the determination is negative, processing proceeds back to create a looping construct at step S3-10 as discussed above.

If all tokens have been processed or an error has occurred, processing proceeds to step S3-14. At step S3-14, memory recovery processes will be initiated.

Processing ends at step S3-15.

Thus, having fully described the present invention by way of example with reference to the attached drawings figures, it will be readily appreciated that many changes and modifications may be made to the invention and to any of the exemplary embodiments shown and/or described herein without departing from the spirit or scope of the invention, which is defined in the appended claims.

What is claimed is:

1. A network client having instructions embodied in computer-readable medium that, when executed, cause a processor to manifest content received over a network of computers, the network client comprising:

a scanner component configured to access an input content stream representing at least a layout source document via a network connection to extract renderable content from the layout source document, the renderable content being associated with at least one particular grammar;

a parsing component coupled to the scanner component configured to parse the renderable content and determine whether the renderable content includes one or more malformed expressions; and a replaceable document type definition component configured to, based on a determination that the renderable content includes a malformed expression:

select a particular layout document type definition for the renderable content from among multiple layout document type definitions, the particular layout document type definition corresponding to the at least one particular grammar, and control the parsing component to parse the renderable content based on the particular layout document type definition to transform at least one of the malformed expressions included in the renderable content to a well-formed expression capable of being rendered.

2. The network client according to claim 1, the particular layout document type definition corresponds to a definition for HTML documents.

3. The network client according to claim 1, the particular layout document type definition corresponds to a definition for XML documents.

4. The network client according to claim 1, wherein the network connection is one that receives the content stream from an Internet site.

5. The network client according to claim 4, wherein the Internet site is a world wide web site.

6. The network client according to claim 1, wherein the grammar defines a well-formed document parsable by the parsing component.

7. The network client according to claim 1, wherein the replaceable document type definition component is configured to control the parsing component based on the particular document type definition which corresponds to a definition for RTF documents.

8. The network client according to claim 1, wherein the replaceable document type definition component is configured to control the parsing component based on the particular document type definition which corresponds to a definition for PDF documents.

9. A method for manifesting content received via a network, comprising:

accessing an input content stream via a network connection to receive renderable content from the input content stream, the input content stream representing at least a layout source document, the renderable content being associated with at least one particular grammar;

determining whether the renderable content includes one or more malformed expressions;

based on a determination that the renderable content includes a malformed expression, selecting a particular layout document type definition for the renderable content from among multiple layout document type definitions, the particular layout document type definition corresponding to the at least one particular grammar; and parsing the renderable content based on the particular layout document type definition to transform at least one of the malformed expressions included in the renderable content to a well-formed expression capable of being rendered.

10. The method according to claim 9, wherein the particular layout document type definition corresponds to a definition for HTML type documents.

11. The method according to claim 9, wherein the particular layout document type definition corresponds to a definition for XML documents.

12. The method according to claim 9, wherein the network connection is one that receives the content stream from an Internet site.

13. The method according to claim 12, wherein the Internet site is a world wide web site.

14. The method according to claim 9, wherein the grammar defines a well-formed document parsable by the parsing component.

15. A network client having instructions embodied in computer-readable medium that, when executed, cause a processor to manifest content received over a network of computers, the network client comprising:

a parsing engine configured to parse input to a network client, the parsing engine including:

a scanner component configured to access an input content stream including renderable content of at least one particular grammar, the renderable content and the at least one particular grammar of the renderable content varying dynamically;

a document type definition component configured to dynamically select a replaceable document type definition from among multiple replaceable document type definitions and provide the replaceable document type definition to the parsing engine, the replaceable document type definition having the at least one particular grammar of the renderable content and varying dynamically with the renderable content and the at least one particular grammar of the renderable content; and a parsing component configured to parse the input content stream including the renderable content of the at least one particular grammar and generating a content model for the renderable content based on rules of the replaceable document type definition, wherein the input content stream includes one or more malformed expressions, and the parsing component is configured to transform at least one of the malformed expressions to a well-formed expression based on the replaceable document type definition.

16. The network client of claim 15, further comprising a tokenizer for tokenizing the input content stream including the renderable content of the at least one particular grammar.

17. The network client of claim 16, wherein the tokenizer is capable of tokenizing the input content stream including the renderable content of the at least one particular grammar regardless of rules of the at least one particular grammar.

18. The network client of claim 17, wherein the tokenizer tokenizes the renderable content in a like manner regardless of the rules of the at least one particular grammar.

19. A computer system for manifesting content received over a network of computers, the system comprising:

means for accessing an input content stream via a network connection to receive renderable content from the input content stream, the input content stream representing at least a layout source document, the renderable content being associated with at least one particular grammar;

means for determining whether the renderable content includes one or more malformed expressions;

means for selecting, based on a determination that the renderable content includes a malformed expression, a particular layout document type definition for the renderable content from among multiple layout document type definitions, the particular layout document type definition corresponding to the at least one particular grammar; and means for parsing the renderable content based on the particular layout document type definition to transform at least one of the malformed expressions included in the renderable content to a well-formed expression capable of being rendered.

* * * * *